Aug. 25, 1964 R. C. WOOFTER ETAL 3,146,051
TERMINAL AND MOUNTING MEANS
Filed Sept. 12, 1960 7 Sheets-Sheet 1

INVENTORS
ROBERT C. WOOFTER
DONALD G. BAER
BY
Albert F. Reutter
THEIR ATTORNEY

INVENTORS
ROBERT C. WOOFTER
BY DONALD G. BAER

Albert H. Reuther
THEIR ATTORNEY

Aug. 25, 1964 R. C. WOOFTER ETAL 3,146,051

TERMINAL AND MOUNTING MEANS

Filed Sept. 12, 1960 7 Sheets-Sheet 3

INVENTORS
ROBERT C. WOOFTER
DONALD G. BAER
BY

Albert H. Reuther
THEIR ATTORNEY

TERMINAL AND MOUNTING MEANS

Filed Sept. 12, 1960 7 Sheets-Sheet 4

INVENTORS
ROBERT C. WOOFTER
BY DONALD G. BAER

Albert H. Reuther
THEIR ATTORNEY

TERMINAL AND MOUNTING MEANS

Filed Sept. 12, 1960 7 Sheets-Sheet 5

INVENTORS
ROBERT C. WOOFTER
BY DONALD G. BAER

Albert H. Reuther
THEIR ATTORNEY

INVENTORS
ROBERT C. WOOFTER
BY DONALD G. BAER

Albert F. Renthe (signature)
THEIR ATTORNEY

INVENTORS
ROBERT C. WOOFTER
DONALD G. BAER
BY
Albert H. Reuther
THEIR ATTORNEY

United States Patent Office 3,146,051

Patented Aug. 25, 1964

3,146,051

TERMINAL AND MOUNTING MEANS

Robert C. Woofter, Cortland, and Donald G. Baer, Girard, Ohio, assignors to General Motors Corporation, Detroit, Mich., a corporation of Delaware Filed Sept. 12, 1960, Ser. No. 55,483
4 Claims. (Cl. 339—47)

This invention relates to electrical connections, and, particularly to terminal means and mountings thereof.

An object of this invention is to provide a new and improved terminal and mounting means economical to produce and use for standardization of predetermined electrical connections into compact assemblies locked into mating relationship.

Another object of this invention is to provide universal electrical connectors of reduced size for straight line interlock that need include only identical terminals having bodies of metal including a conductor attaching portion on one side of a box-like intermediate portion and extended blade-like longitudinally-embossed-floor portion integral with an angularly deflectable spring tongue portion adapted to mate in locking engagement at least in part within confines of adjacent abutting box-like intermediate portions free of any need for additional body means previously needed to hold terminals together while the box-like intermediate portions cooperate to avoid lateral displacement of mating extending floor portions.

Another object of this invention is to provide universal electrical connectors of reduced size for linear interlock that need include only terminals in pairs each having identical features in common with each other at least one of which can be retained in a mounting of insulating material cut down in size surrounding the terminal because terminal centers are drawn closer together yet permitting mating terminals to fit and lock in telescoping relation limited by abutting intermediate portions of the terminals which go together more easily under minimized insertion pressure though mating terminals are free of requiring mating insulating bodies to maintain electrical contact to which there is ready access.

A further object of this invention is to provide universal terminal means per se having all featured portions thereof identical and common with each other to include a metal body adapted to mate easily with a corresponding identical body neither of which is subject to damage and destruction in service due to repeated insertion and disengagement though each includes a conductor attaching portion on one side of a box-like intermediate portion open at opposite ends and slotted at one side though having at least one tang means projecting with a free end in each of opposite directions integrally formed laterally outwardly and an extended blade-like floor portion integral with the intermediate portion at an end opposite the conductor attaching portion, there being stabilizing rib means extending longitudinally between the intermediate portion and floor portion as well as a spring tongue portion integral with the floor portion at an end thereof remote from the intermediate portion so as to project back angularly to the floor portion and to terminate in an off-set abutment within confines of the boxlike intermediate portion, each box-like intermediate portion having a length substantially equal to lengths of the extended floor portion such that with identical terminals in mating telescopic relation, the box-like intermediate portions abut against each other longitudinally while the spring tongues are resiliently locked and pressed into contiguous electrical contact with each other and the extended floor portion of each body closes off the slotted side of the intermediate box-like portion of the other.

Another object of this invention is to provide a pair of hollow insulating housings and a mating pair of terminal means at least one pair of which can be combined to be identical with each other, for example, the housings when identical each having a longitudinally integral hook-like end on one side adapted slidably to engage an inclined abutment integrally located on an opposite side and, for example, the terminal means when identical each having a conductor engaging end portion on one side of a box-like intermediate portion opposite ends of which are open and interconnected by a longitudinally-extending side slot defined by edges that can straddle a laterally inwardly extending axial rib of an insulating housing for spacing and rigidity in positioning therebetween, opposite side edges of the box-like intermediate portion each having tang means with a free end rejecting laterally outwardly to engage a shoulder of the insulating housing in a location adjacent to the conductor attaching end portion, there being additional tang means with a free end struck from the intermediate portion and extending remote from the conductor attaching end portion and engageable with further shoulder means of the insulated housing.

Further objects and advantages of the present invention will be apparent from the following description, reference being had to the accompanying drawings wherein preferred embodiments of the present invention are clearly shown.

Figures 15, 16, 17, 18:
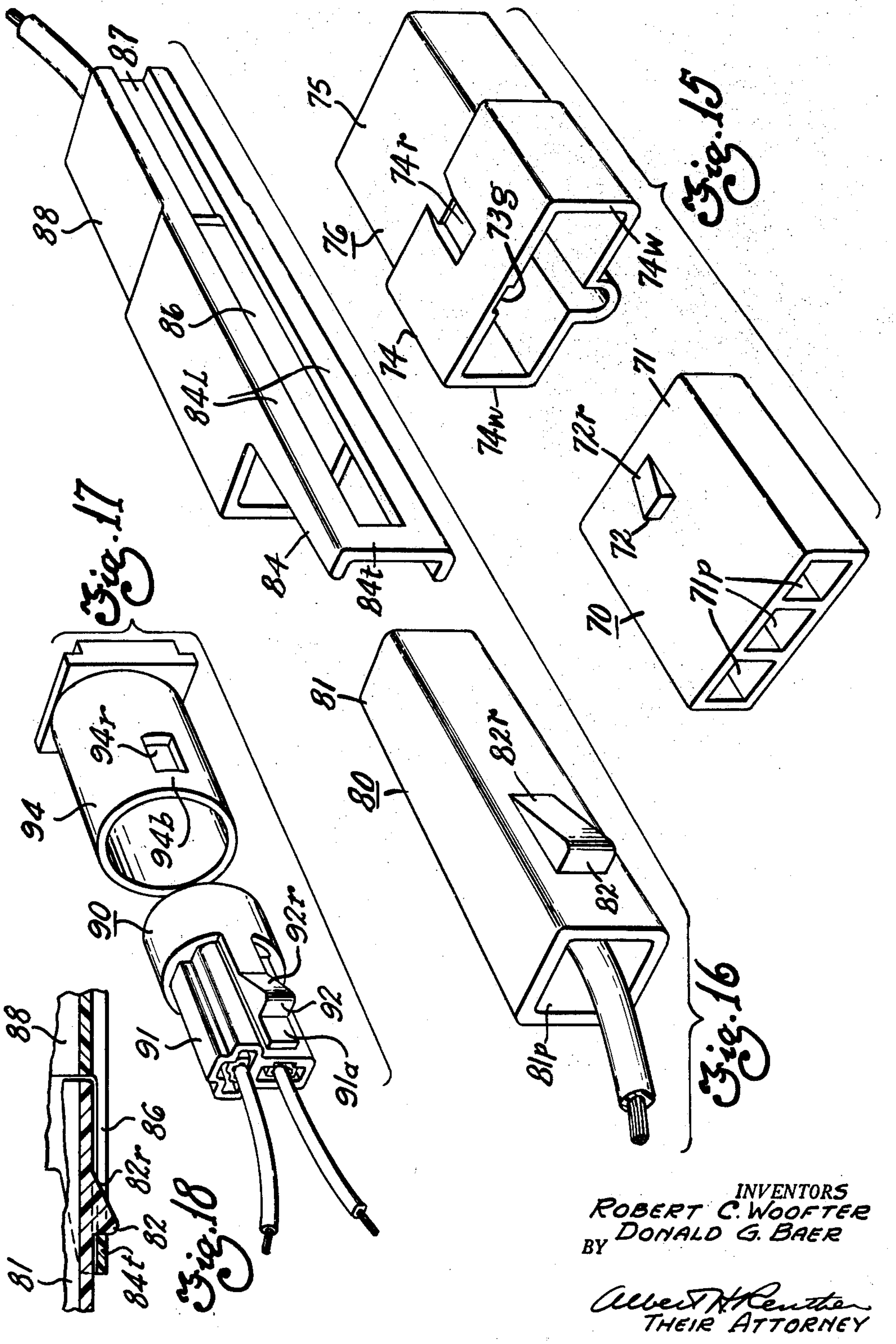

FIGURES 15, 16, and 17 are exploded perspective views of further housing means that can be used with terminal means of the present invention.

FIGURE 18 is a fragmentary cross-sectional elevational view to represent interlocking portions of housing means such as shown in FIGURES 15, 16, and 17.

Universal terminal means per se having portions identical and common with each other can be seen in various views of the drawings. Such universal terminal means generally indicated by numeral 20 can include a metal body 21 having a conductor attaching portion 22 on one side of a box-like intermediate portion 23 and remote from a longitudinally extended blade-like floor portion 24 integral with the intermediate portion 23 at an end opposite to the conductor attaching portion 22. A spring tongue portion 25 is integral with the extended floor portion 24 at an end 25*e* thereof remote from the intermediate portion 23. The spring tongue portion 25 projects rearwardly substantially at an acute angle relative to the extended floor portion 24 and terminates in a downwardly off-set abutment 25*a* within confines of the box-like intermediate portion 23. It is to be noted that each box-like intermediate portion 23 has a length substantially equal to length of the extended floor portion 24 such that with identical terminals in mating telescopic relation the box-like intermediate portions 23 abut against each other longitudinally while the spring tongues are resiliently locked and pressed into contact with each other as will be seen in further views of the drawings.

Figure 1A:
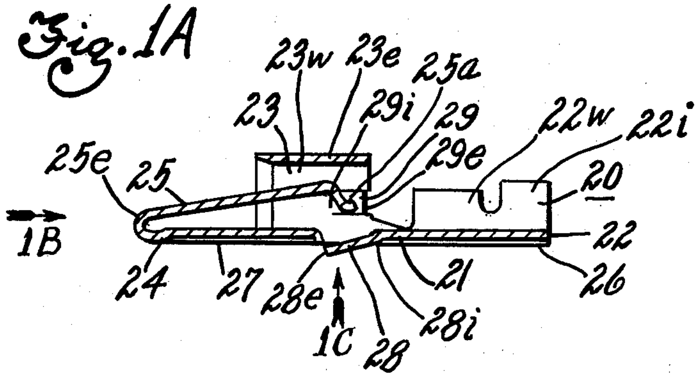
FIGURE 1A is a cross-sectional elevational view taken along line A—A in FIGURE 1.
Figure 1B:
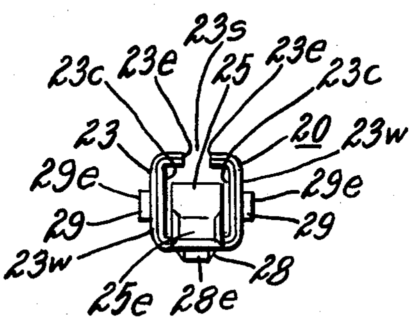
FIGURES 1B and 1C are end and side views taken in the directions of arrows B and C respectively, in FIGURE 1A.

The conductor engaging portion 22 can include dual pairs of deformable lateral wings or extensions including a first pair of wings 22*w* adapted to be bent, deformed and crimped into electrical engagement with a bare metal wire or conductor in a well-known manner. A further pair of lateral extensions such as 22*i* are also adapted to be bent toward each other so as to be curled around an insulating covering of a conductor or wire. To increase rigidity and stability between portions 22, 23, and 24, of the metal body 21, there can be provided rib means 26 and 27 extending longitudinally or axially as upwardly projecting embossings visible in FIGURES 1, 1A and 1C. In a location between these rib means or embossings 26–27, there is a first tang means 28 integral at an end 28*i* with the metal body 21 adjacent to the conductor engaging portion 22 and having a free end 28*e* extending downwardly from the intermediate portion 23. Provision of the rib means or embossing 26 is optional whereas rib means 27 extending between the intermediate portion 23 and blade-like extension portion 24 can greatly enhance longitudinal strength of the terminal means 20 in accordance with the present invention. The intermediate portion 23 further includes a pair of laterally outwardly extending tangs 29 which terminate in free ends 29*e* substantially adjacent to the conductor engaging portion 22 and remote from the end 25*e* of the spring tongue portion 25. The tangs 29 have an integral end 29*i* joined to sidewalls 23*w* of the intermediate portion 23. These sidewalls 23*w* terminate in laterally inwardly bent edges 23*e* spaced substantially parallel from each other for a predetermined distance defining a slot 23*s* which is above at least a part of the spring tongue portion 25. The intermediate portion along the walls 23*w* can be provided with a coined or beveled edge 23*c* to facilitate linear interfitting of terminals with each other and serving particularly as a guide for the end 25*e* and spring tongue portion 25 of mating terminals as will be apparent further from the drawings and following description.

Figure 2:
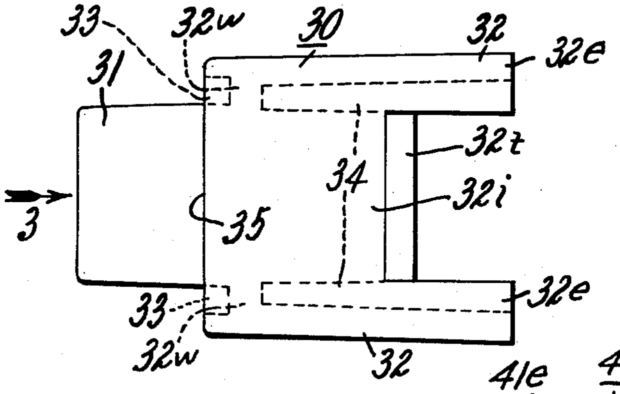
FIGURE 2 is a plan view of one portion of insulating housing means adapted for terminal means in accordance with the present invention.

The terminal means 20 in accordance with the present invention can be used alone in pairs such that a self-contained interlocking electrical connection is established or the terminal means can be used together with a mounting or insulating housing. Such insulating housing means can include a pair of body portions each having a hollow interior into which terminal means such as 20 and the like can be fitted. FIGURE 2 is a plan view of one portion 30 of insulating housing means adapted for terminal means in accordance with the present invention. This portion 30 includes a hollow body 31 and integral laterally outwardly extending socket means 32 defining a substantially rectilinear recess 33 on one side of a radially outwardly extending wall 32*w*. On an opposite side of the radially or laterally outwardly extending wall 32*w* there is another substantially rectilinear recess 34 formed by an inner periphery of the socket means 32. The socket means 32 includes a pair of substantially opposite lateral extended ends 32*e* joined by an intermediate portion 32*i* which terminates at a longitudinally off-set and tapered, transverse edge 32*t* further visible in FIGURES 6 and 7 of the drawings. An abutment or locking edges 35 is provided in a location longitudinally spaced on one side of the tapered edge or end 32*t*. The hollow body 31 includes an axial passage 31*p* visible in FIGURES 3, 6, and 7. A pair of substantially parallel and opposite shoulders 31*s* are provided integrally with the body 31 of insulating material and are adapted to be engaged on one side by tangs 29 having free ends 29*e* as described above. These ends 29*e* of tangs 29 engage shoulders 31*s* so as to lock the terminal means 20 into body 31 and prevent removal thereof in one direction. Removal in an opposite direction is prevented by engagement of a free end 28*e* of the tang 28 against an abutment 31*a* formed by a longitudinally extending cutout 31*c* visible in FIGURES 6 and 7. On a side opposite to that where the abutment 31*a* is located, there is a longitudinally-extending rail portion 31*r* which is adapted to be located between edges 23*e* of the sidewalls 23*w* of the intermediate portion 23 having a box-like configuration including the longitudinal slot 23*s*. The rail portion 31*r* fills or substantially fills the space of the slot 23*s* between the edges 23*e* so as to assure maintenance of predetermined spacing of the ends 23*e* from each other.

Figure 4:
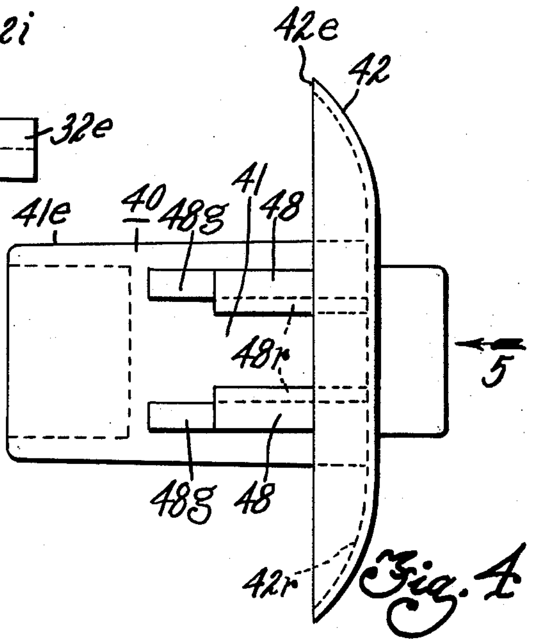
FIGURE 4 is a plan view of another portion of insulating housing means for use with the portion of FIGURES 2 and 3.
Figure 5:
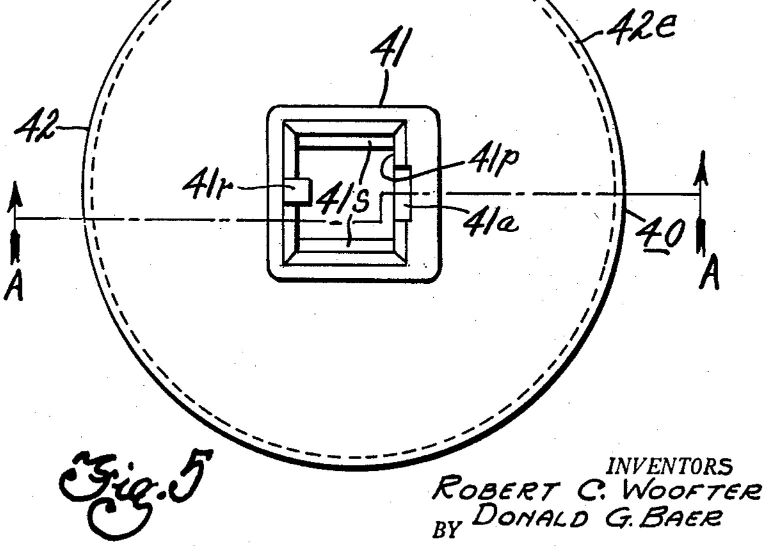
FIGURE 5 is an end view in the direction of arrow 5 in FIGURE 4.
Figure 6:
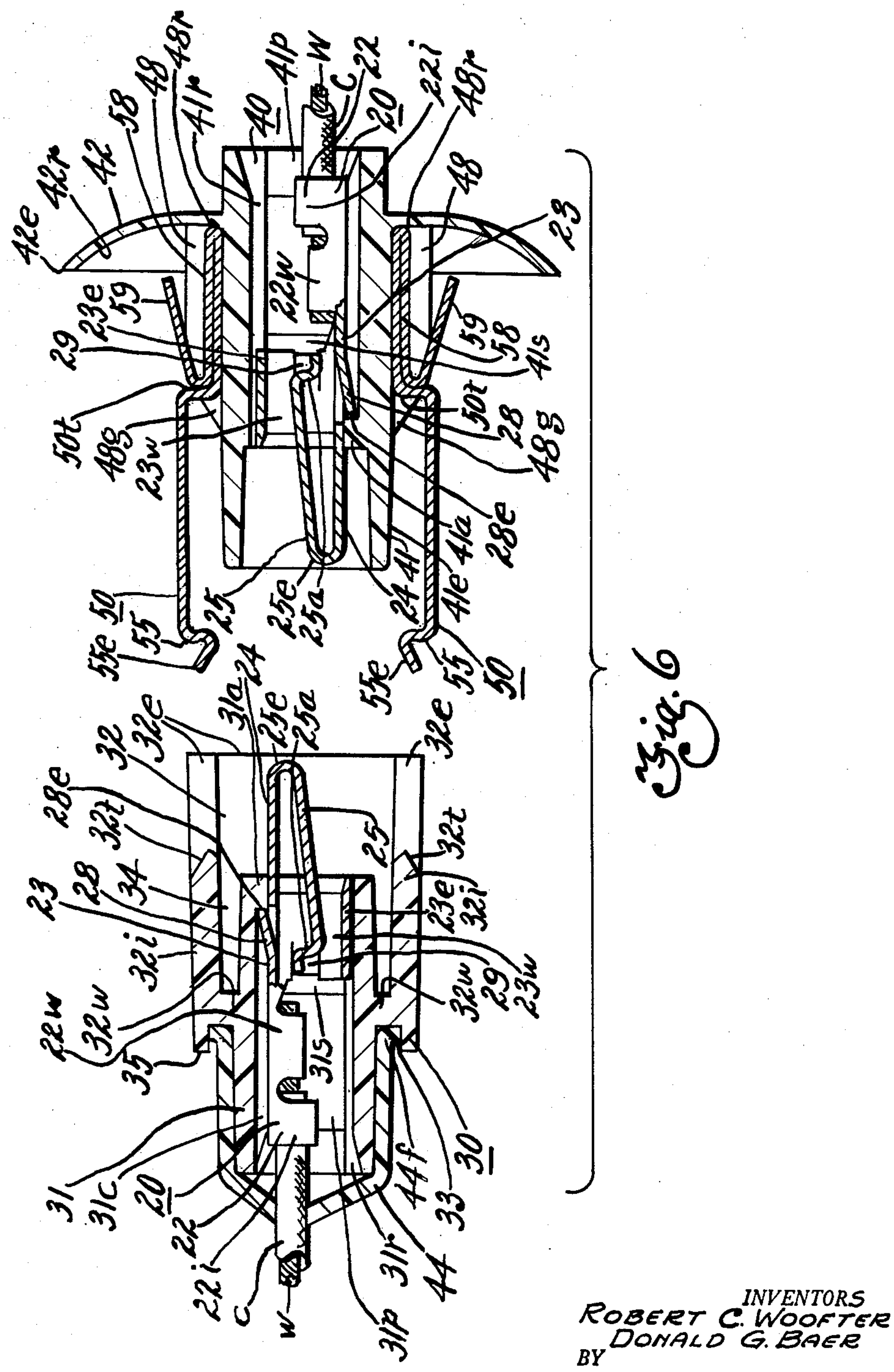
FIGURE 6 is a partially sectioned exploded view of terminal means fitted into housing portions of FIGURES 2–3–4–5.
Figure 7:
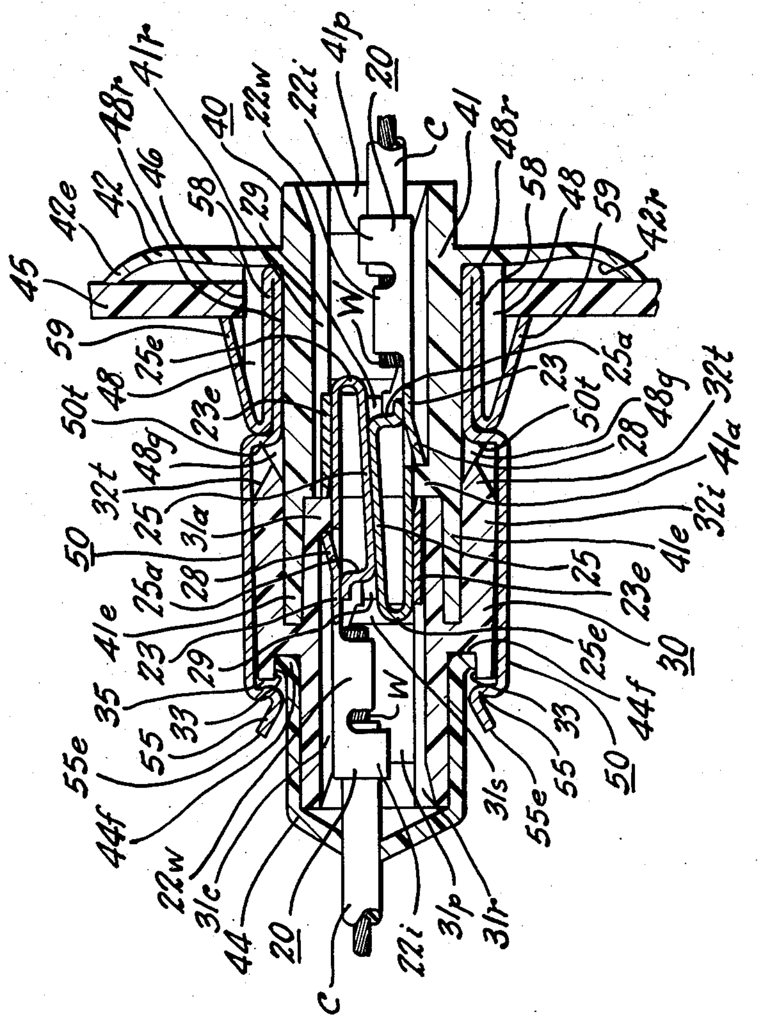
FIGURE 7 is a partially sectioned view of an assembly of terminal means and housing portions of FIGURE 6.

Another insulating housing or portion 40 is shown in FIGURES 4 and 5 including a central body 41 with a substantially rectilinear extension 41*e* or sidewalls adapted to mate in the recess 34 as shown in the drawings. The body 41 includes an integral laterally outwardly extending flange means 42 having a cup-like shape and terminating in an annular edge 42*e* adapted to engage a suitable mounting panel surface. A recess 42*r* is formed between the body 41 and flange means 42. As can be seen in FIGURES 5, 6, and 7, the body 41 has an axial passage 41*p* extending longitudinally therein and having a pair of opposite shoulders 41*s* similar to shoulders 31*s* of body 31 provided therein. An abutment 41*a* and rail portion 41*r* are also provided integrally with the body 41 for purposes similar to those of abutment 31*a* and rail portions 31*r*.

Figure 1:
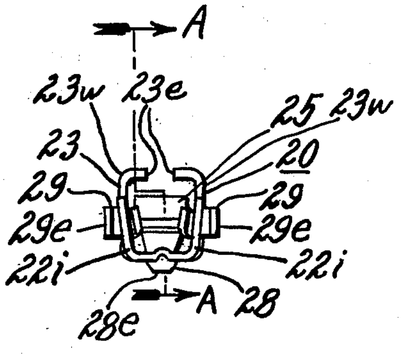
FIGURE 1 is an end view of the terminal means in accordance with the present invention.
Figure 1C:
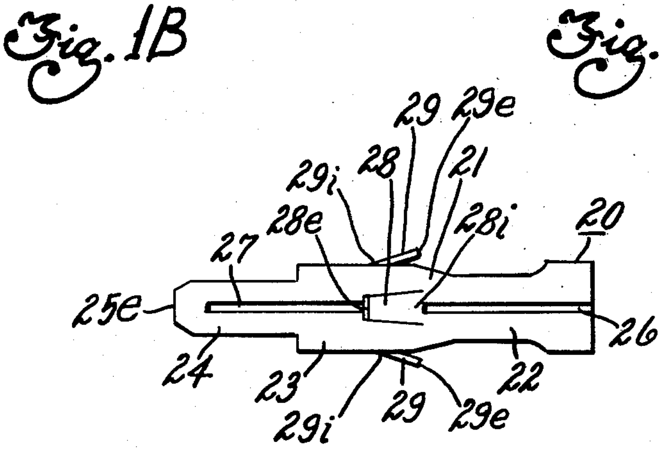
Figure 3:
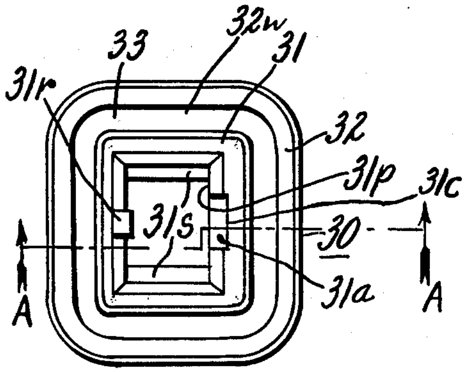
FIGURE 3 is an end view in the direction of arrow 3 in FIGURE 2.

FIGURES 6 and 7 are cross-sectional elevational views taken along section lines A—A indicated in views of FIGURES 1, 3, and 5. Thus, FIGURES 6 and 7 show the insulating housing portions as well as the terminal means in cross section both in exploded and assembled positions. Terminal means such as 20 are shown connected to a conductor or wire W having an insulating covering C visible in FIGURES 6 and 7. When a water and weather-proof connection is desired, a boot means 44 visible in FIGURES 6 and 7 can be fitted to engage the insulating covering C at one end and having a flange portion **44*f* snugly fitted into the recess 33 of the housing portion 30. This boot means 44 closes off the passage 31*p* in which terminal means 20 is fitted relative to the housing portion 30. The flange 42 has the edge 42*e* thereof in engagement with the mounting panel 45 with an aperture 46 therein through which the housing portion 40 is fitted. The edge 42*e* sealingly engages one side or surface of the panel 45. The extension portion 41*e* fits into the recess 34 and a clip or metal clamp means generally indicated by numeral 50 can be provided on each of opposite sides to lock the housing portions 30 and 40 into engagement with each other. Each of these metal clips or clamps 50 has a flexible free end 55 adapted to be positioned longitudinally to one side of the abutting edge 35 of the housing portion 30. These resilient ends 55 also serve to maintain positioning of the flange end 44*f* of the boot means 44 in the recess 33. Unless the resilient ends 55 are spread apart by use of a suitable tool means such as a screw driver or fingers engageable relative to edges 55*e*, the housing portions 30 and 40 remain in locked and assembled relationship as illustrated in FIGURE 7. The body portion 40 further includes a pair of L-shaped portions or channels 48 integral at one end with the flange portion or means 42 and terminating in a slanted guided means or guard 48*g* visible in FIGURES 4, 6, and 7 together with a recess 48*r* into which doubled back body portion 58 of the clip or clamp means 50 is wedged. It is to be understood that opposite lateral edges of this double back portion 58 of the clip or clamp means 50 have a width sufficient to fit into the recesses 48*r*. A prong end 59 of each clip or clamp means 50 projects laterally and can engage a side or surface of the mounting panel 45 opposite to the side or surface engaged by edge 42*e* which together assure positioning of the housing portions in locked relation to the panel 45. It is apparent that the double back portion 58 of the clip or clamp means 50 cannot be forced to slide out of the recesses 48*r* for a distance sufficient to permit disassembly of the components or parts since the tapered edge 32*t* is located adjacent to the guide means or guard means 48*g* in the assembled relationship of parts illustrated in FIGURE 7. A transverse portion 50*t* engages the tapered edge 32*t* in the event an attempt is made to pull apart the insulating housing portions 30 and 40 by pulling axially to the right on the body 41 as seen in FIGURE 7. Thus, removal from the panel 45 is obviated once the parts are assembled and only displacement of the free ends 55*e*** can effect a disassembly of the insulating housing portions.

It is apparent in FIGURES 6 and 7 how the terminal means 20 mate with each other. Particularly in FIGURE 7, it can be seen that spring tongue portions 25 are slidably engageable and in contact with each other substantially over their entire length and abutments **25*a* engage the box-like intermediate portion 23 while ends 25*e* are located at substantially opposite open ends of the box-like portions in locations remote from each other. Each of the box-like portions 23 has opposite open ends as well as the slot 23*s* and the blade-like extension 24 of one terminal means closes off the slot 23*s*** of a mating, identical terminal means. This mating and abutting relationship is apparent in sectional showing of one pair of mating terminals in FIGURE 7 and also for another pair of similar mating terminal means per se can be further seen in the perspective view of FIGURE 14.

Figure 8:
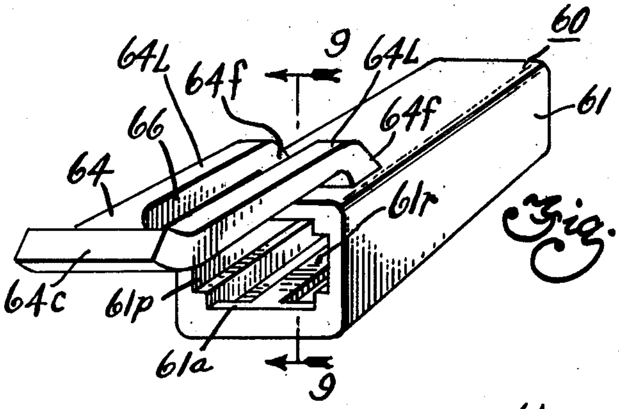
FIGURE 8 is drawn to a modification of terminal housing means and provides a perspective view of a universal interlocking body means of insulating material for use with terminal means in accordance with the present invention.
Figure 10:
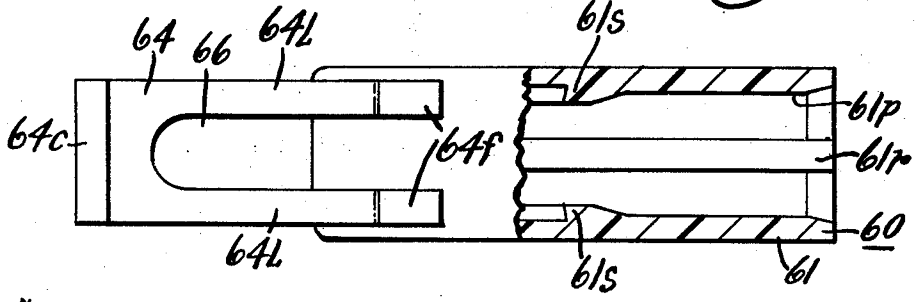
FIGURE 10 is a partially sectioned view taken along line 10—10 in FIGURE 9.
Figures 9, 11, 13:
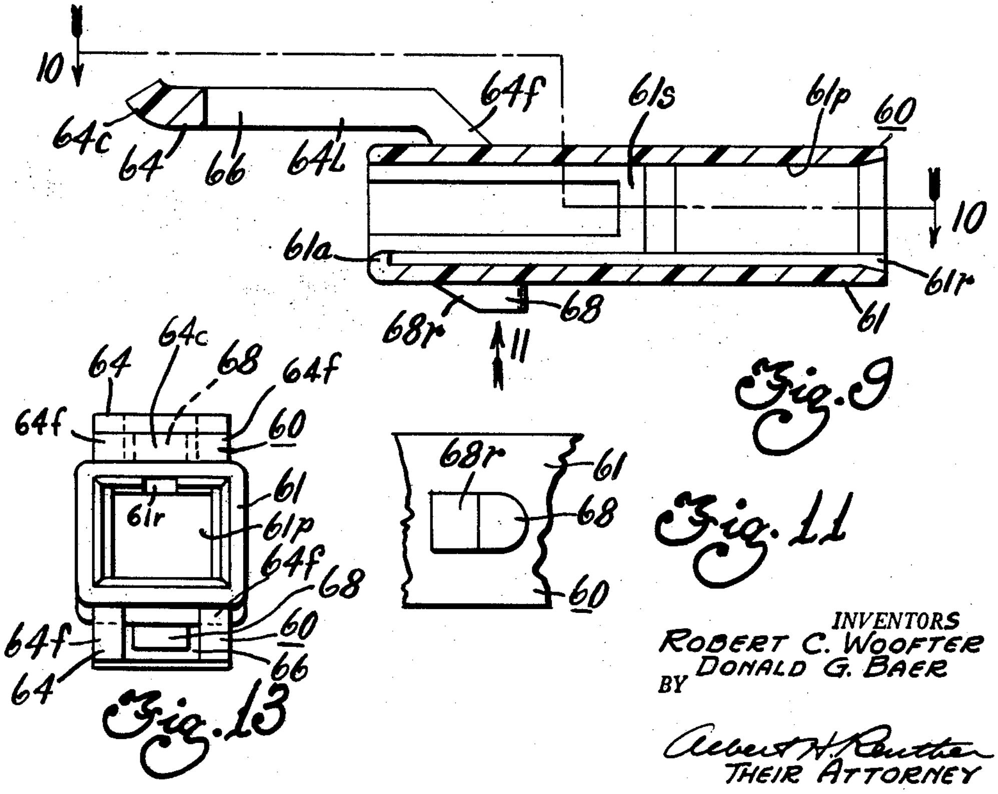
FIGURE 9 is a cross-sectional elevational view taken along line 9—9 in FIGURE 8.
FIGURE 11 is a fragmentary view taken in the direction of arrow 11 in FIGURE 10.
FIGURE 13 is an end view taken in the direction of arrow 13 in FIGURE 12 to show interlocking body means alone without mating terminal means therein.
Figures 12, 14:
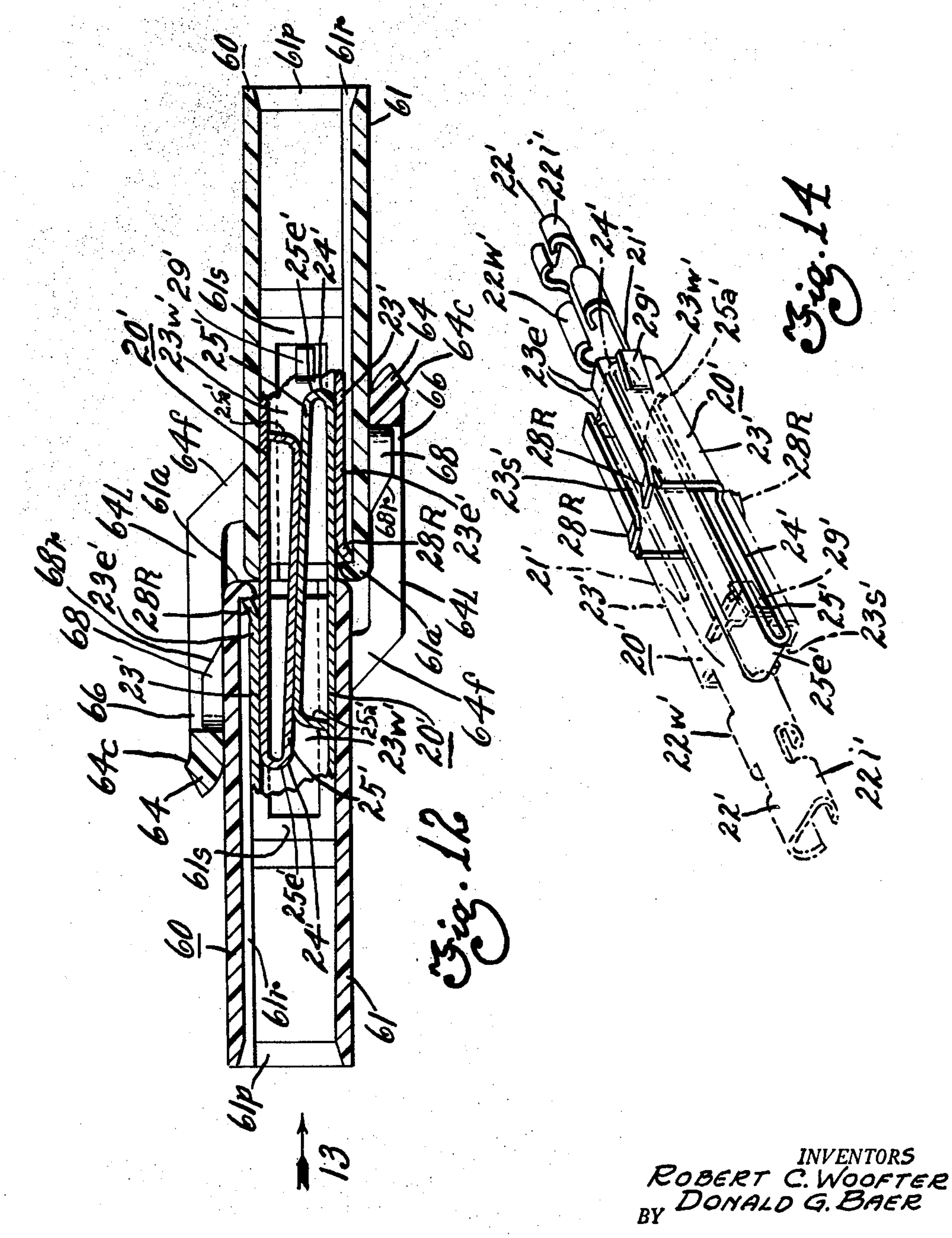
FIGURE 12 is a fragmentary cross-sectional elevational view of pairs of identical terminal means and identical body means thereof in assembled interlocking positions.
FIGURE 14 is a view to outline a pair of identical terminal means alone adapted to be retained in interlocked condition as self-contained items free of any body or housing means which would hold terminal means together.

In the structures described thus far, two identical terminal means have been mated. It is emphasized that these terminal means per se of both FIGURES 1–7 as well as 14 require no insulating body to maintain electrical contact though in FIGURE 6 tangs 28–29 are shown anchoring each terminal means to a housing portion. However, in accordance with the present invention it is also possible to provide a pair of identical housing means of insulating material. Such housing means generally indicated by numeral 60 can be seen in FIGURES 8 through 12 of the drawings. Each identical housing means 60 includes a body 61 having a passage **61*p* extending longitudinally therethrough similar to the passages 31*p* and 41*p* described earlier. A rail portion 61*r* can be seen in FIGURES 8 and 10. Shoulders 61*s* are visible in FIGURES 9 and 10. These shoulders 61*s* are adapted to be engaged by lateral tangs such as 29 described as engageable with similar shoulders 31*s* and 41*s*. The body 61 is adapted for use with terminal means similar to those described earlier but differing in that the tang 28 is replaced by a pair of tangs 28R on each of the walls such as 23*w* in corners adjacent to each edge 23*e* as shown in FIGURE 12 and further visible in FIGURE 14. Remaining parts of the terminal means such as 20 are substantially identical in views described earlier and therefore in FIGURES 12 and 14 the same reference numerals distinguished by priming are applied to similar terminal components. The view of FIGURE 14 illustrates how the primed counterparts of box-like intermediate portions 23 having longitudinal slots 23*s* are fitted with the blade-like extension portion 24 which serves to close off the slot when the terminals having identical features mate with each other. FIGURE 14 represents that terminal means 20 or 20′ in accordance with the present invention can mate with each other and remain self-contained and in interlocked relationship without presence of any housing means or insulating material though one such terminal means is shown in full and the other in phantom to facilitate visualization of relationship of mating parts telescopically relative to each other. However, the housing means 60 can be identical in all respects and can also interlock relative to each other to supplement the interlock of the terminal means per se by provision of features further in accordance with the present invention. It is apparent in FIGURE 12 that the tangs 28R can abut against an end abutment 61*a* of each housing 60. In FIGURE 12, only fragmentary showing of mating terminal means such as 20 or 20′ is provided such that structure of the housing means 60 can be more easily seen. Each housing means 60 having a body 61 of insulating material includes an extension 64 which defines a recess or cutout 66 engageable by a lateral projection 68 of a corresponding body 61. The extension 64 as seen in FIGURES 8 and 10 can have a substantially U-shape and can be laterally offset by flanges 64*s* integral with a sidewall of the body 61. A laterally outwardly curved end portion 64*c* can be located transversely with respect to longitudinal portions 64L of the extension 64 so as to define the recess 66. Each abutment 68 is integral with a wall of the body 61 in a location opposite to the location of the intergral flanges 64*f*. Each abutment 68 includes a ramp portion 68*r* adapted to cooperate with the curved transverse portion 64*c*. This abutment 68 and a ramp 68*r* can be seen in views of FIGURES 9, 11, and 12. FIGURE 13 is an end view showing only mating of identical housing means 60 and terminal means 20 adapted to fit therein are purposely omitted from the view of FIGURE 13 to facilitate understanding of the mating and interlocking portions including the abutments such as 68 and extensions 64. The rail portion or rib such as 61*r* is adapted to be straddled by edges such as 23*e*** of the box-like intermediate portion which is open at opposite ends.

FIGURES 15, 16 and 17 provided exploded perspective views of further housing means that can be used with terminal means of the present invention. However, in each of these examples, only the terminal means will be identical with each other. The housing means of FIGURE 15 and also FIGURE 16 are similar to the housing means of FIGURES 8 through 13 though slightly different in shape and structure. A male housing portion generally indicated by numeral 70 in FIGURE 15 includes a body of insulating material 71 having plural passages **71*p*** therein and including a laterally outwardly extending abutment 72 with an incline or ramp portion 72r adapted to engage a groove 73g on an extension 74 of an insulating body 75 of a female housing portion generally indicated by numeral 76. There is provided a cut-out or recess 74r into which the abutment 72 can fit and is adapted to be retained in locked relationship. Separation of the male and female housing portions can be effected by temporarily providing lateral pressure against walls 74w on opposite sides of the extension 74 so as to deform the extension 74 with respect to the grooves 73g and recess 74r.

In FIGURE 16, a female housing portion 80 includes a body 81 of insulating material having a passage 81p therein and including a laterally outwardly extending abutment 82 integral with an incline or ramp portion 82r adapted to engage an extension 84 including a transverse portion 84t and recess 86 on one side of a channel or slot 87 formed by legs or longitudinal portions 84L extending integrally between the extension 84 and a body 88 of a mating housing portion. FIGURE 17 illustrates a cylindrical socket or male housing portion generally indicated by numeral 90 including a body 91 into which terminal means can fit and having a longitudinally extending arm 91a integral therewith provided with an abutment 92 and incline or ramp portion 92r adapted to fit relative to a cutout or recess 94r of a female housing portion 94. By laterally inwardly deflecting the arm 91a, it is possible to effect disengagement of the abutment 92 with respect to a bridge 94b integral with the body of the housing portion 94 so as to release the abutment from locking engagement with respect to the edge of the bridge on one side of the recess or cutout 94r. The arm is sufficiently flexible to return to a position substantially parallel to the body 91 and in such parallel position, the arm 91a will maintain locking relationship between the insulating housing portions. FIGURE 18 is representative of interlocking of an abutment and a cutout or a recess provided by the mating housing portions of FIGURES 15, 16, and 17. For purposes of illustration, reference numerals corresponding to those of FIGURE 16 are applied in FIGURE 18.

It is apparent that terminal means such as 20 in accordance with the present invention can be interlocked relative to each other either with and without housing means. In some installations at least one housing means can be provided for predetermined stacking and spacing of adjacent identical terminal means that can be mated with identical terminal means which are self retaining to each other without secondary housing portions. Identical terminal means when used for electrical connections on motor vehicles for example are particularly useful because all terminal means are interchangeable and fit in mating relationship to similar terminals so as to provide interchangeability and ready access to connections that can be established with a minimum of insertion force. For example, with the identical terminal means, 20, in accordance with the present invention, there is required an insertion force to mate terminals with themselves requiring a force of only one to two and one half pounds compared with a force of five to twelve pounds for establishing mating and insertion of male and female terminal means of a type such as disclosed in Patent 2,682,038—Johnson—belonging to the assignee of the present invention. With the identical terminal means including box-like intermediate portions 23, it is possible for centers or center lines of terminals to be closer to each other so as to reduce the size of bodies of insulating materials sometimes used for mounting the terminals. Another example of an installation using terminal means in accordance with the present invention can be found in a disclosure of application S.N. 55,482 filed September 12, 1960, and belonging to the assignee of the present invention. It is also to be understood that the box-like intermediate portions 23 permit telescoping engagement of the blade-like extensions 24 and resilient tongues 25 to be protected laterally in all directions. Individual mating connecitons of such identical terminals can be evenly established in resilient interlocked relationship and a wrapping of suitable insulating material such as plastic tape and the like can be provided whenever service repairs are made to electrical components on a vehicle so as to require making and breaking of electrical connections. The identical terminals 20 in accordance with the present invention go together easily and are self-retaining and the box-like intermediate portions when engaged by a blade-like extension and spring tongue of an identical terminal will assure lateral stability in that the blade-like extensions such as 24 and spring tongue 25 cannot shift laterally out of electrical contact with a corresponding spring tongue both enclosed laterally within confines of the abutting box-like intermediate portions 23. An appreciable reduction in cost of components for electrical connections results in standardization of either terminal means or housings identical in every respect to each other. Separation of identical housing means such as 60 can be effected by inserting a tool such as a screw driver along an underside of the curved end portion 64c and prying the inner or lower curved surface thereof out of engagement with the outer curved surface of the abutment or projection such as 68. It is to be understood that the identical terminal means such as 20 can be used for electrical connections not only for motor vehicles but also for appliances including electric ranges and the like.

It is noted that the blade-like extension portion 24 and intermediate box-like portion 23 are substantially equal in length such that when there is a telescoping of parts, the box-like intermediate portions completely enclose the spring tongue portion 25 as well as the extension blade-like portion 24. The box-like intermediate portions are substantially square in cross section.

While the embodiments of the present invention herein disclosed constitute preferred forms, it is to be understood that other forms might be adopted.

What is claimed is as follows:

1. Connector means for linear interlock including a pair of separable terminals and mounting means therewith, comprising, a pair of insulating mounting bodies each having an axial passage therein including first and second shoulder means located laterally in spaced apart positions, interlock means provided for telescopic mating of said insulating bodies per se, a pair of identical metal terminal bodies each including a conductor attaching portion, a box-lke intermediate portion integral at one end with said conductor attaching portions and having integral first as well as second tang means projecting laterally outwardly to engage said first and second shoulder means respectively for prevention of removal thereof in opposite directions inside each of said insulating bodies, an extended blade-like floor portion longitudinally integral with said box-like intermediate portion at an end opposite to that of said conductor attaching portion, said box-like portion being open at opposite ends, a spring tongue portion integral with said blade-like floor portion at an end thereof remote from said intermediate portion so as to project back angularly to said floor portion and having a width less than that of each box-like intermediate portion to permit termination of each spring tongue portion within confines of said box-like intermediate portion, each of said spring tongue portions having a length substantially equal to the total length of said blade-like floor portions plus that of said box-like intermediate portions for face-to-face full-length electrical contact of corresponding tongue portions resiliently maintained totally enclosed within said box-like intermediate portions per se axially adjacent to each other simultaneously with outer telescopic mating of said interlocking means of said insulating bodies, said box-like intermediate portions having said tongue portions telescopically shielded therebetween when said box-like intermediate portions complement and axially abut each other.

2. Connector means for linear interlock including a pair of separable terminals and mounting means therewith, comprising, a pair of insulating mounting bodies each having an axial passage therein including first and second shoulder means located laterally in spaced apart positions, interlock means provided for telescopic mating of said insulating bodies per se, a pair of identical metal terminal bodies each including a conductor attaching portion, a box-like intermediate portion integral at one end with said conductor attaching portions and having integral first as well as second tang means projecting laterally outwardly to engage said first and second shoulder means respectively for prevention of removal thereof in opposite directions inside each of said insulating bodies, an extended blade-like floor portion longitudinally integral with said box-like intermediate portion at an end opposite to that of said conductor attaching portion, said box-like portion being open at opposite ends, a spring tongue portion integral with said blade-like floor portion at an end thereof remote from said intermediate portion so as to project back angularly to said floor portion and having a width less than that of each box-like intermediate portion to permit termination of each spring tongue portion within confines of said box-like intermediate portion, each of said spring tongue portions having a length substantially equal to the total length of said blade-like floor portions plus that of said box-like intermediate portions for face-to-face full-length electrical contact of corresponding tongue portions resiliently maintained totally enclosed within said box-like intermediate portions per se axially adjacent to each other simultaneously with outer telescopic mating of said interlock means of said insulating bodies, said box-like intermediate portions having said tongue portions telescopically shielded therebetween when said box-like intermediate portions complement and axially abut each other, said insulating bodies having a pair of substantially parallel metal clips as interlock means to hold said insulating bodies together, each of said pair of substantially parallel metal clips having a laterally inwardly bent free end projecting from one body on which it is secured and adapted to lock resiliently behind an edge of the other body to one end away from internal interfit of identical metal terminal bodies having axially abutting box-like intermediate portions completely enclosing said spring tongue portions of less width and insulated from said pair of substantially parallel metal clips by said insulating bodies.

3. Connector means for linear interlock including a pair of separable terminals and mounting means therewith, consisting of, a pair of insulating mounting bodies each having an axial passage therein including first and second shoulder means located laterally in spaced apart positions, interlock means provided for telescopic mating of said insulating bodies per se, a pair of identical metal terminal bodies each including a conductor attaching portion, a box-like intermediate portion integral at one end with said conductor attaching portions and having integral first as well as second tang means projecting laterally outwardly to engage said first and second shoulder means respectively for prevention of removal thereof in opposite directions inside each of said insulating bodies, an extended blade-like floor portion longitudinally integral with said box-like intermediate portion at an end opposite to that of said conductor attaching portion, said box-like portion being open at opposite ends, a spring tongue portion integral with said blade-like floor portion at an end thereof remote from said intermediate portion so as to project back angularly to said floor portion and having a width less than that of each box-like intermediate portion to permit termination of each spring tongue portion within confines of said box-like intermediate portion, each of said spring tongue portions having a length substantially equal to the total length of said blade-like floor portions plus that of said box-like intermediate portions for face-to-face full-length electrical contact of corresponding tongue portions resiliently maintained totally enclosed within said box-like intermediate portions per se axially adjacent to each other simultaneously with outer telescopic mating of said interlock means of said insulating bodies, said box-like intermediate portions having said tongue portions telescopically shielded therebetween when said box-like intermediate portions complement and axially abut each other, one of said insulating bodies having a radially outwardly projecting cup-like flange portion integral therewith and resiliently axially deflectable sealingly to engage one side of a support having an aperture through which the body fits, a pair of metal clips as interlock means secured to be located substantially parallel to each other directly on one insulating body extending adjacent to said cup-like flange portion, each of said pair of substantially parallel metal clips having opposite laterally inwardly and outwardly bent end portions respectively to hold mating bodies together and to provide a rigid backstop against a side of the support opposite to the side resiliently engaged by said cup-like flange portion, said outwardly bent end portions being deflectable inwardly for assembly and disassembly through the support, said inwardly bent end portions being deflectable outwardly for release of telescopic mating of both insulating bodies and said identical metal terminal bodies axially from each other, and a weather-resistant boot means dovetailed onto a free end of one insulating body at a location remote from said flange portion, said insulating bodies having a dovetail telescopic sealing fit snugly in a location laterally outwardly of said inner telescopic enclosure of box-like intermediate portions that axially abut each other while said spring tongue portions of less width than that of said box-like intermediate portions engage each other for a full length equal to length of both box-like intermediate portions that axially abut each other.

4. In a connector means for linear interlock including separable terminals and mounting means therewith such that each of a pair of insulating mounting bodies has an axial passage therein including first and second shoulder means located laterally in spaced apart positions, the improvement which comprises both inner and outer telescopic mating and simultaneous maintenance of shielded electrical interconnection established internally by identical metal terminal bodies each including a conductor attaching portion, a box-like intermediate portion integral at one end with said conductor attaching portions and having integral first as well as second tang means projecting laterally outwardly to engage said first and second shoulder means respectively thereby to obviate removal thereof in opposite directions inside each of said insulating bodies, an extended blade-like floor portion longitudinally integral with said box-like intermediate portion at an end thereof opposite to that of said conductor attaching portion, said box-like portion being open at opposite ends, a spring tongue portion integral with said blade-like floor portion at an end thereof remote from said intermediate portion so as to project back angularly to said floor portion and having a width less than that of each box-like intermediate portion to permit termination of each spring tongue portion entirely within confines of said box-like intermediate portion, each of said spring tongue portions having an overall length substantially equal to the total length of both that of said blade-like floor portions plus that of said box-like intermediate portions for face-to-face full-length electrical contiguous surfacing contact of corresponding tongue portions resiliently maintained totally inside longitudinally adjacent box-like intermediate portions per se in a location laterally inwardly from outer telescopic mating of said insulating bodies, said box-like intermediate portions having said tongue portions telescopically shielded therebetween when said box-like intermediate portions complement and axially abut each other.

(References on following page)

References Cited in the file of this patent

UNITED STATES PATENTS

| | | |
|---|---|---|
| 1,664,684 | Heigeby | Apr. 3, 1928 |
| 1,835,688 | Atwood | Dec. 8, 1931 |
| 2,113,328 | Makenny | Apr. 5, 1938 |
| 2,119,146 | Adams | May 31, 1938 |
| 2,198,704 | Lazich | Apr. 30, 1940 |
| 2,406,895 | Olson | Sept. 3, 1946 |
| 2,682,038 | Johnson | June 22, 1954 |
| 2,719,956 | Leighton | Oct. 4, 1955 |
| 2,891,103 | Swengel | June 16, 1959 |
| 2,897,471 | De Tar | July 28, 1959 |
| 2,925,577 | Cetran et al. | Feb. 16, 1960 |
| 2,938,190 | Krehbiel | May 24, 1960 |
| 2,987,697 | Davis | June 6, 1961 |
| 3,037,183 | Hopkins | May 29, 1962 |

FOREIGN PATENTS

| | | |
|---|---|---|
| 1,098,645 | France | Aug. 16, 1955 |